Jan. 17, 1956 G. GORHAM ET AL 2,730,923
UNITARY MICROSCOPE-SUPPORT AND LAMP
Filed Aug. 9, 1949 4 Sheets-Sheet 1

INVENTORS
GEORGE GORHAM AND
ANDRES FERRARI, JR.
BY Edwin Levisohn +
Harry Cohn
ATTORNEYS

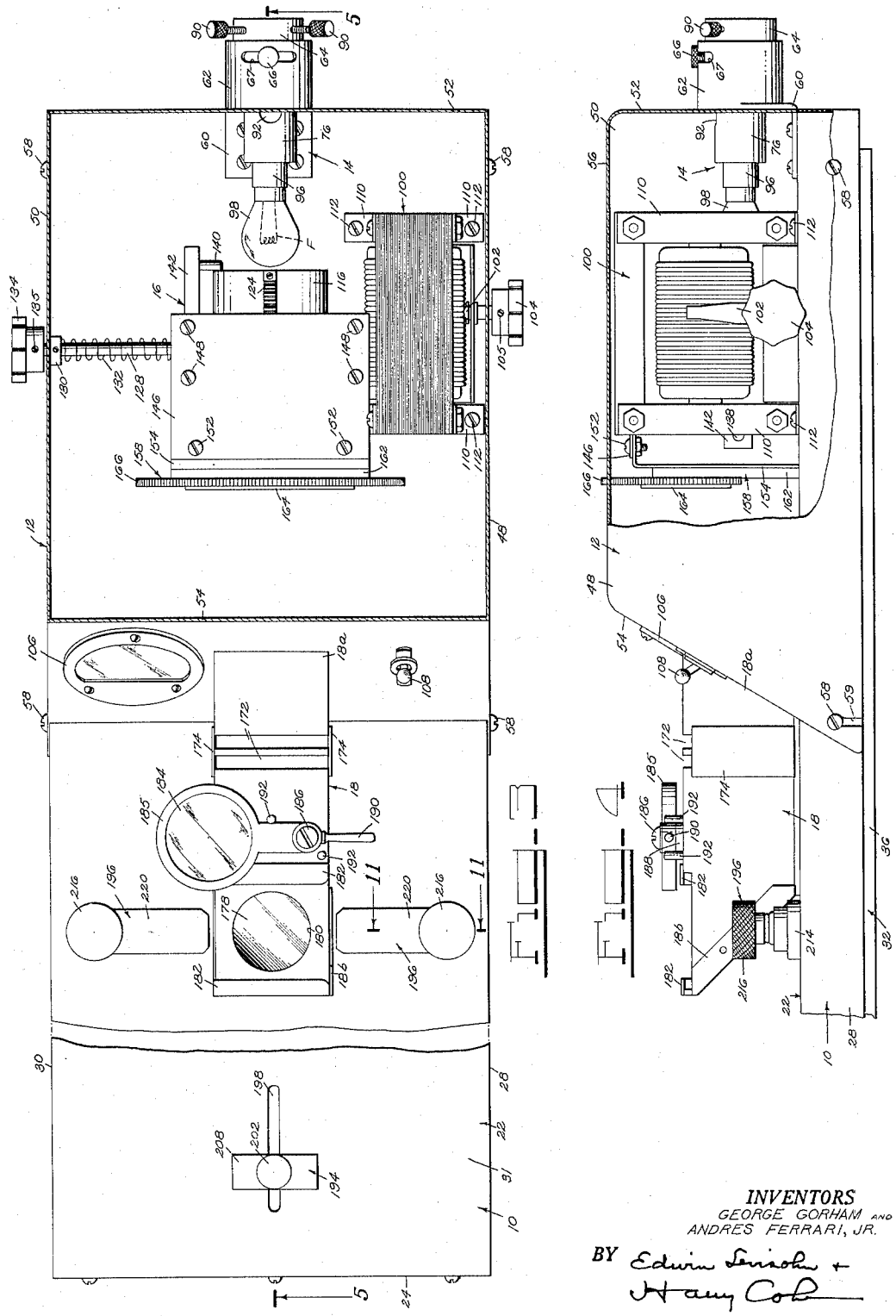

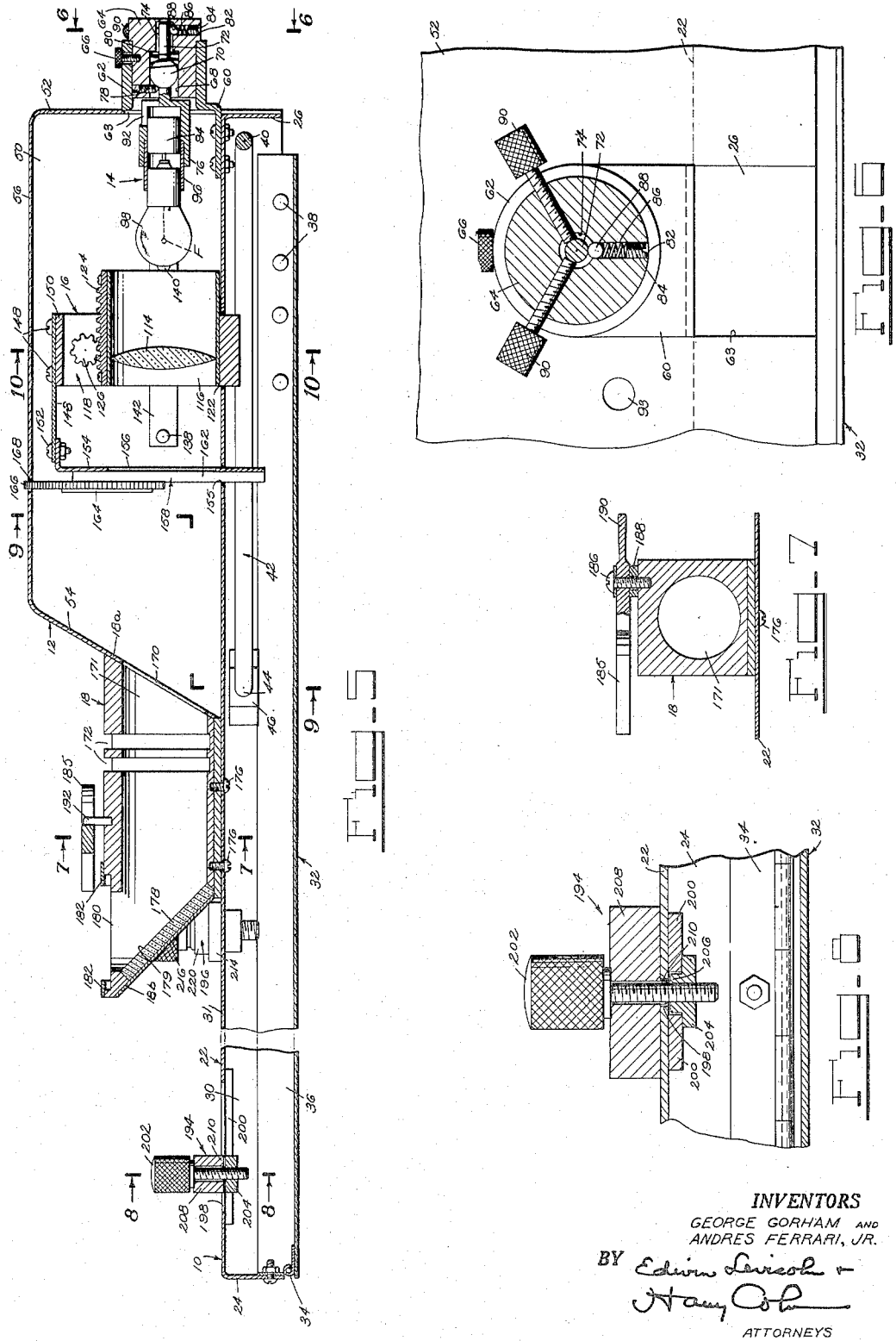

Jan. 17, 1956 G. GORHAM ET AL 2,730,923
UNITARY MICROSCOPE-SUPPORT AND LAMP
Filed Aug. 9, 1949 4 Sheets-Sheet 4
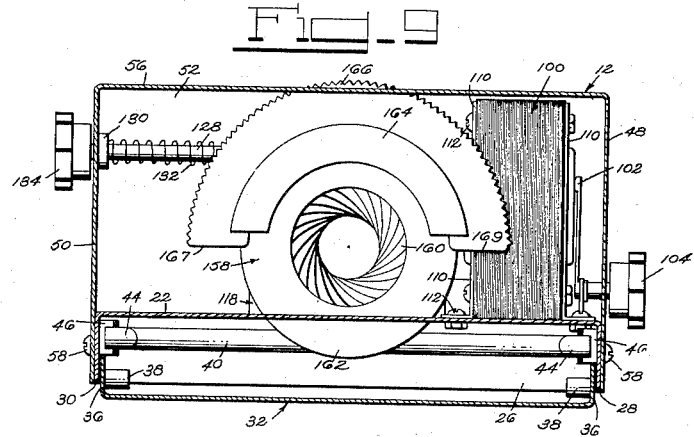
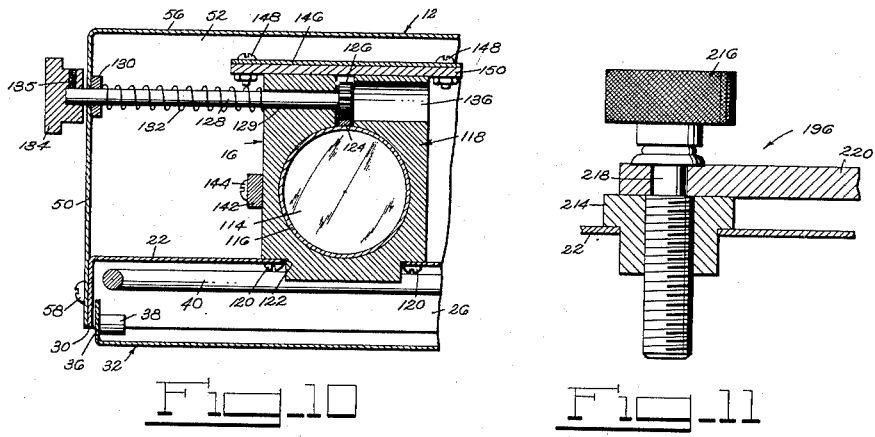
INVENTORS
GEORGE GORHAM AND
ANDRES FERRARI, JR.
BY Edwin Levisohn +
Harry Cohn
ATTORNEYS United States Patent Office 2,730,923
Patented Jan. 17, 1956

2,730,923

UNITARY MICROSCOPE-SUPPORT AND LAMP

George Gorham, New York, and Andres Ferrari, Jr., Uniondale, N. Y., assignors, by mesne assignments, to Scopicon, Inc., Chauncey, N. Y., a corporation of New York Application August 9, 1949, Serial No. 109,346

2 Claims. (Cl. 88—40)

This provision relates to microscope lamps.

One object of the invention is the provision of a unitary microscope-support and lamp constructed and arranged to maintain the proper relation between the optical system of the lamp and that of the microscope which is positioned on the support, and to accomplish this result without requiring a microscope of special or unusual construction.

Another object of the present invention is the provision of an adjustable microscope support provided with a light projection system, the axis of which is automatically maintained in correct disposition relative to the optical axis of the microscope, as the support is adjusted to its various positions.

Another object is to provide a tiltable unitary microscope-support and lamp of generally simplified construction and provided with means for adjusting, focussing and spreading the light from said lamp.

The above and other objects, features and advantages of the invention will be fully understood from the following description, considered in connection with the accompanying illustrative drawings.

In the drawings:

Fig. 3 is a plan view of the support, the top of the housing thereof being cut-away to show the parts therein;

Fig. 4 is a view, in elevation, of the support illustrated in Fig. 3, a side portion of the housing being cut-away for purposes of illustration;

Fig. 5 is a sectional view, partly in elevation, taken on line 5—5 of Fig. 3;

Fig. 6 is a sectional view taken on line 6—6 of Fig. 5;

Fig. 7 is a sectional view taken on line 7—7 of Fig. 5;

Fig. 8 is a sectional view taken on line 8—8 of Fig. 5;

Fig. 9 is a sectional view taken on line 9—9 of Fig. 5;

Fig. 10 is a fragmentary sectional view taken on line 10—10 of Fig. 5; and

Fig. 11 is a fragmentary sectional view taken on line 11—11 of Fig. 3.

Figure 1:
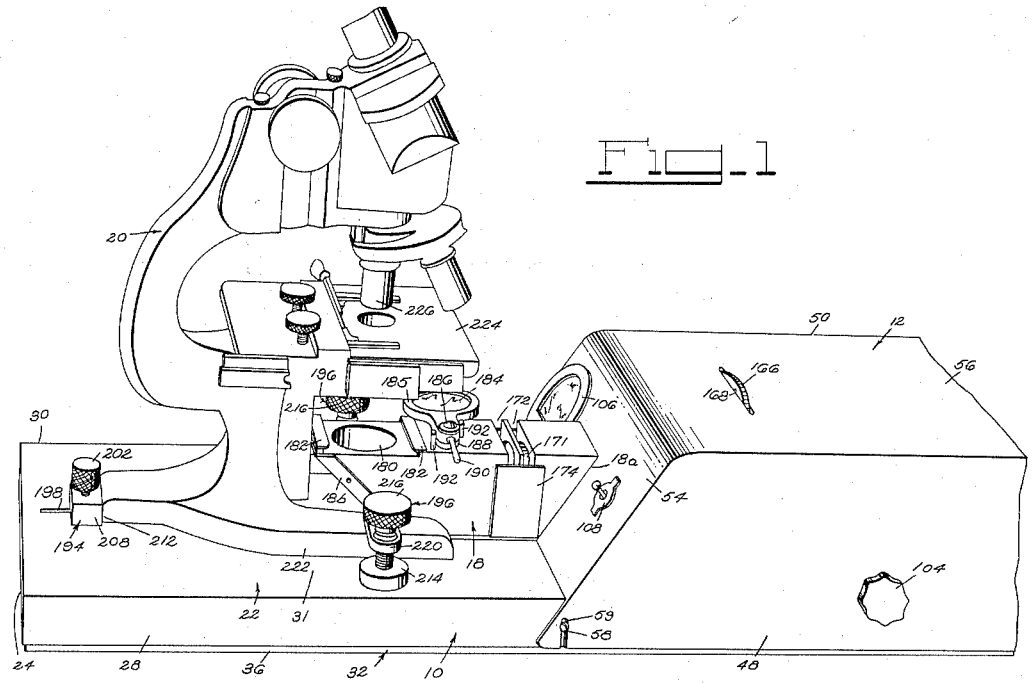
Fig. 1 is a perspective view of a microscope-support and lamp embodying the invention, showing a microscope mounted on the support.

As here shown, the unitary-microscope support and lamp of the present invention comprises a base 10, a housing 12 removably mounted thereon, a lamp assembly 14 (Figs. 3 and 5) and an optical assembly 16 mounted within the housing, and a light passage member 18 mounted on the base and extending from said housing to the microscope 20.

Figure 2:
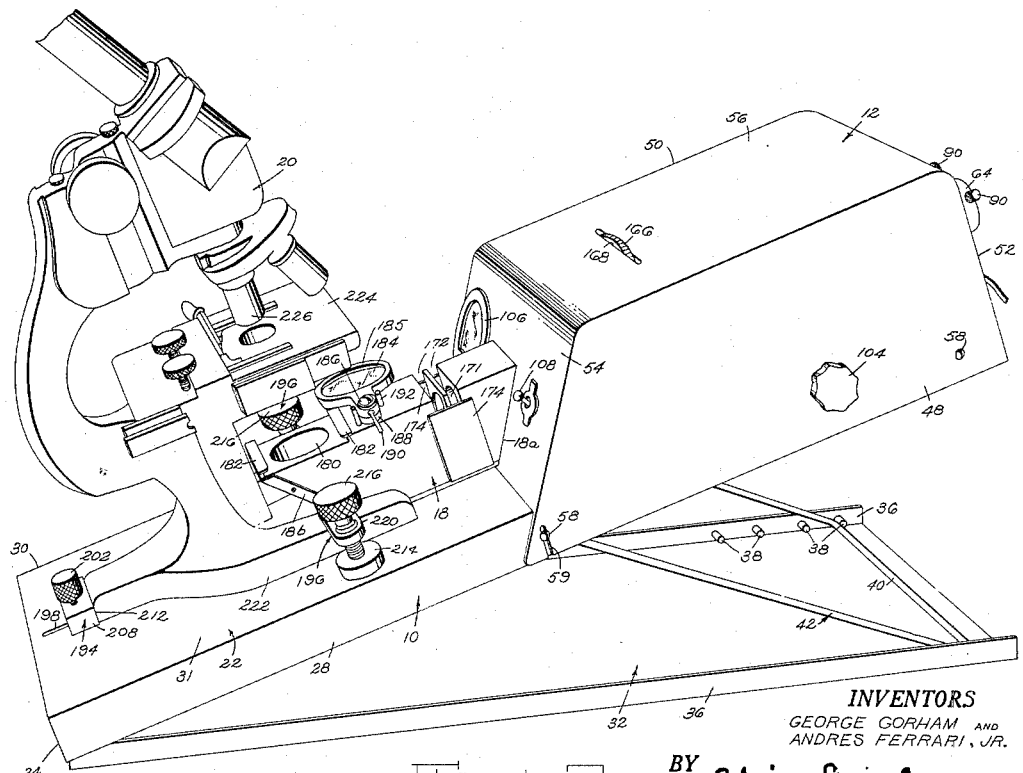
Fig. 2 is a view similar to Fig. 1 showing the support adjusted in an inclined position for tilting the microscope toward the user.

Base 10 is preferably formed of sheet metal and is provided with an upper flat wall 22, depending end walls 24 and 26 (Fig. 5) and depending lateral walls 28 and 30. The forward part 31 of the base wall 22 provides a support for the microscope, which may be of any suitable type, and the part of the base wall 22 rearwardly of the microscope-support provides a support for the microscope lamp and elements associated therewith. The base is provided with means for the angular or tilting adjustment thereof, relative to a supporting surface, said means comprising a part 32 adapted to be disposed on the supporting surface and provided with hinge or pivot means 34 (Figs. 5 and 8) secured to end wall 24. Said part 32 is narrower than the base so that the side walls 36 thereof are positioned inwardly of lateral walls 28 and 30 of the base in the normal horizontal or retracted position of the latter, as illustrated in Fig. 1. Side walls 36 are provided with confronting spaced pairs of pins or stops 38 (Figs. 2 and 9) which engage the cross-bar portion 40 of an adjustable bracket 42, the ends 44 of which are pivotally mounted in brackets 46 (Fig. 9) carried by side walls 28 and 30 of the base. In the normal horizontal position of the base, bracket 42 is in retracted position between the lateral walls of the base, as illustrated in Fig. 5. It will be apparent that the base can be moved on the hinge and maintained in various predetermined angular positions relative to the supporting surface, by positioning the cross bar 40 to engage different pairs of stops 38, as illustrated in Fig. 2, the maximum angular or tilted position being attained when said cross-bar is in engagement with the innermost pair of stops 38, the minimum angular position being illustrated in said figure. Said stops can be formed in any other way, for example by portions struck-out from walls 36 as will be obvious.

Referring now to housing 12 and to the components contained therein, it will be noted that said housing comprises the lateral walls 48 and 50 and the end walls 52 and 54, the wall 54 sloping outwardly from top wall 56. The housing is removably secured to the base by screws 58 which thread into sides 28 of the base and engage sides 48 and 50 of the housing in slots or openings 59. The housing completely encloses lamp assembly 14 and optical assembly 16.

Lamp assembly 14 comprises the bracket plate 60 (Figs. 3, 4 and 5) mounted on wall 22 of the base, said plate being provided with an integral cylindrical portion 62 disposed externally of rear wall 52, adjacent thereto, said plate extending through an opening 63 provided in said wall. An adjustably positionable cylindrical lamp holder part 64 is mounted within said cylindrical portion 62, said holder part being provided with a thumb screw 66 which extends into a slot 67 formed in part 62 whereby holder 64 may be adjusted circumferentially of part 62. Holder part 64 is provided also with an internal recess 68 within which is disposed a ball pivot 70 provided with an integral shaft portion 72 which extends into a narrowed portion 74 of said recess, said pivot being an integral part of or otherwise fixed to lamp socket 76 which extends into the housing through the aperture 63 therein. A pointed screw 78 provided in part 64 extends into the recess and holds the pivot 70 in said recess. A spring 80 disposed about shaft 72 biases the pivot against said screw to prevent axial displacement of the socket. For the vertical and lateral adjustment of socket 76, there is provided in holder part 64 a bore 82 extending from the outer surface thereof to recess portion 74, said bore being provided with a screw 84 for maintaining a spring 86 in engagement with a metal ball 88 which presses shaft 72 against the thumb screws 90 threaded into holder 64. It will be noted that the lamp socket 76 is thus mounted for universal adjustment and can be adjusted vertically and laterally, by adjustment of screws 90, to position the electric lamp carried by said socket in axial alignment with the condensing lens hereinafter referred to, of the optical system. The provision for adjusting member 64 circumferentially of support 62, by screw 66 in slot 67, enables the lamp to be positioned so that its filament F (Fig. 3) is in optimum position, i. e., so that it extends laterally of and parallel to the upper wall 22 of the base 10. Socket 76 is provided with an opening 92 for the connection of an electric wire to center contact 94, disposed therein, and with an aperture 93 (Fig. 6) provided in wall 52 for a wire connected to sleeve contact 96 which is engaged by the base of the lamp or light-source 98. A step-down transformer 100 is mounted on upper base wall 22, said transformer being preferably an auto-transformer provided with a variable tap contact 102 in electrical contact with the transformer winding and operated by a control knob 104, as is well understood, for regulating the power supplied to the lamp. A volt-meter 106 for indicating the voltage supplied to the lamp and switch 108 for turning the lamp on and off are provided on housing wall or panel 54. The transformer may be mounted in any suitable manner within the housing. As here shown, the transformer is carried by a frame 110 secured to the base wall 22 by screws 112. Control knob 104 projects outwardly of housing wall 48 for conveniently regulating the power supplied to the lamp and thereby adjusting the intensity of the light source. Knob 104 is removably secured to the shaft of contact 102 by a set screw 105 so that said knob may be removed when it is desired to remove housing 12 from the base 10.

The optical assembly 16 comprises a condensing lens 114 vertically mounted in a cylindrical sleeve 116 which is slidable in a holder 118. The latter is secured by screws 120 in a cut-out portion 122 in base wall 22. To provide for said axial movement of lens sleeve 116, a rack 124 is secured thereto and a pinion 126 is provided for engagement with said rack. More particularly, pinion 126 is mounted on a shaft 128 which is positioned in a bore 129 in holder 118. Shaft 128 extends outwardly of housing wall 50 and carries a collar 130 which abuts the inner surface of said housing wall when the pinion engages the rack (see Fig. 10), a spring 132 mounted on said shaft between the collar and holder or mount 118 biasing the pinion into engagement with the rack. An operating knob 134 is removably affixed to the shaft by a set screw 135. It will be noted that when it is desired to remove the housing 12, knob 134 is removed from the shaft 128 so that the latter may be pushed inwardly, against spring 132, clear of the inner side of wall 50. The bore 136 in lens mount 118 to receive pinion 126 allows this movement of shaft 128, and it will be understood that spring 132 returns the shaft to its normal position with pinion 126 in operative engagement with rack 124 when the housing 12 is re-positioned on the base. This mounting of shaft 128 for longitudinal movement may be omitted when side wall 50 is provided with a slot, open at its bottom to receive the projecting end of the shaft. A similar open-bottom slot may be provided to receive the shaft of contact 102, so that housing 12 may be removed and replaced without removing knobs 104 and 134. It will be understood that knob 134 and the rack and pinion mechanism actuated thereby are operable to adjust the position of lens 114 in relation to lamp 98 for focussing the light on the microscope. Stop pins 138 and 140 (Figs. 3 and 5), carried by a bar 142 secured to the holder 118 by screw 144, constitute means for limiting the travel of the lens sleeve 116 in both directions.

A plate 146 provides a support for means, preferably an iris diaphragm, for regulating the size of the opening for the passage of light from lens tube 116 to the microscope. Said plate 146 is secured by screws 148 to a strap 150 fixed to sleeve holder 118, and by means of screws 152 supports a diaphragm-mounting plate 154 in position transversely of the base wall 22 in a cut-out 155 therein. Said plate 154 is provided with an opening 156 for the passage of the light from the lens tube 116 to the microscope. A diaphragm assembly 158 is secured to plate 154, said assembly comprising an iris diaphragm 160 (Fig. 9) vertically mounted in a diaphragm holder 162 positioned transversely of the base and extending into cut-out 155. The diaphragm assembly is provided with a stationary guide part 164 and with a knurled diaphragm adjusting member 166 which projects through a slot 168 in the upper wall 56 of the housing. As is well understood, member 166 is manually rotatable to variably adjust the size of the aperture and to open and close the light passage whereby the passage of light from the light source 98 to the microscope may be interrupted. Upper wall 22 serves as a detent for the diaphragm assembly, the opposite ends 167 and 169 of member 166 engaging wall 22 to limit the rotation thereof in each direction. In this connection, it will be understood that when one of said ends of member 166 engages wall 22 of the base, the diaphragm is completely closed and that when the other end engages said wall the diaphragm is opened to the desired maximum amount.

From the diaphragm assembly, the light passes into the enclosed light passage member 18 through an opening 170 in housing wall 54. Member 18 has a cylindrical light passage 171 therethrough and is provided with open-top transverse slots 172 for the insertion of one or more color filters, or for other suitable purposes, the sides of said slots being closed by cover plates 174. Member 18 is secured to wall 22 of the base by screws 176. The inner end 18a of said member abuts the inclined front wall 54 of the housing and is bevelled as shown (Fig. 5) to fit against said wall. The opposite end of said member is closed by the inclined wall 18b which provides a support for a reflector 178 which is preferably a mirror. Said mirror 178 is preferably silvered on the front surface 179 thereof to prevent refraction. Said mirror is maintained at a 45° angle to the optical axis of lens 114 to reflect the light through the outlet 180 in the top of member 18, in line with the optical axis of the microscope. Member 18 is provided, adjacent said light outlet, with straps 182 for retaining a cover (not shown) over the light outlet 180 to exclude dust or other foreign matter from mirror 178 when the apparatus is not in use.

A light-diverging lens 184 is provided for use, if desired, for spreading the light when the lower power objectives of the microscope are used. Said lens is mounted in a frame or holder 185 which is pivotally mounted, by a pivot screw 186, on the upper surface of the light passage member 18 (see Fig. 7), a washer 188 being disposed between the light spreader frame 185 and the top surface of member 18. It will be apparent that the light spreader may be pivotally moved by its handle 190, to position said light spreader over light outlet 180 when required. Detents 192 are provided to limit the movement of the light spreader to its operative and retracted positions, respectively.

In order to secure the microscope in proper position on part 31 of base 10, the adjustable stop 194 and the clamps 196 are provided. For the provision of adjustable stop 194, said wall part 31 is provided with a longitudinal slot 198 and with the guide parts 200 (Fig. 8) secured to the under-surface of said wall part on either side of said slot. A thumb screw 202 is threaded into a nut 204 provided with a portion 206 which is noncircular and slidably engages the guide members 200 in the space therebetween and is thereby held from turning when screw 202 is threaded therein. Said screw releasably holds stop member 208 in adjusted position on the upper surface of the base. Said stop member has a reduced portion 210 which engages in slot 198 and thereby prevents said member from turning. It will be apparent that member 208 is adjustable longitudinally of the base for abutting the end 212 of the heel of the base of the microscope to prevent the latter from turning when the legs of the microscope base are clamped. Each clamp 196 comprises a flange portion 214 (Fig. 11), fixed in wall part 31 and a thumb screw 216 threaded therein. Said thumb screw is provided with a portion 218 of reduced diameter on which is pivotally mounted a clamping part 220, said part engaging the upper surface of a leg 222 of the base of the microscope, as illustrated in Figs. 1 and 2, for releasably securing the microscope in position on upper wall 22 of the base.

The operation and utility of the unitary microscope support and lamp are apparent in large measure from the above description. It will be readily understood that the microscope may be used in the upright position as illustrated in Fig. 1, the base 10 being in a horizontal position, or in a forwardly tilted position, as illustrated in Fig. 2, the base 10 being supported in an inclined position, all depending upon the preference of the user. In either case, the optical axis of the microscope lamp is maintained automatically at all times in correct relation to the optical axis of the microscope, and this correct relation is preserved irrespective of the degree of inclination of said base and the lamp carried thereby. It will be apparent that the light from the lamp is always projected in a straight line along the axis of the optical assembly through the light passage member 18 to mirror 178 below the microscope stage 224 and, due to the 45° angle of mirror 178, the light passes through outlet 180, at right angles to the line in which it was directed to the mirror, to the microscope objective 226 which has been disposed in operative position.

It will be understood that the microscope, per se, does not comprise part of our invention and that the unitary microscope-support and lamp here described is not limited to use with the particular type of microscope illustrated in the drawings.

While we have shown and described the presently preferred embodiment of our invention, it will be understood that various changes in the details of construction and in the form and arrangement of parts may be made without departing from the underlying idea or principles of this invention within the scope of the appended claims.

Having thus described our invention, what we claim and desire to secure by Letters Patent, is:

1. A unitary microscope-support and lamp, comprising a base support having a forward part on which to mount and support the microscope base and a rear part on which the lamp for the microscope is bodily mounted, means carried by said forward part of the base support for reflecting light from the lamp upwardly through the optical system of the microscope when the latter is positioned on said base, means on said forward part of the base support for releasably securing the microscope in position in relation to said light-reflecting means, and a light-diverging lens mounted for movement about an axis parallel to the optical axis of the microscope and in a plane between said reflector and the stage of the microscope from a retracted position out of the path of light from said reflector to the microscope to an operative position in the path of the light from said reflector to the microscope.

2. A unitary microscope-support and lamp comprising a base member, a lamp mounted on a predetermined part of said base member, said base member having a part thereof which is spaced from said first mentioned part for mounting the base of the microscope in predetermined relation relative to said lamp, and said lamp comprising a light source housing mounted on said first mentioned part of said base member and an optical system for projecting light from said light source toward the microscope, in a straight line parallel to said base member at a level lower than the stage of the microscope and at right angles to the optical axis of the microscope, and a reflector mounted on said base member in position for reflecting the projected light upwardly at right angles to the optical axis of the lamp, said reflector being positioned so that it is below the stage of the microscope and in line with the optical axis of the microscope when the latter is mounted in position on said base member, and a light-diverging lens mounted for movement about an axis parallel to the optical axis of the microscope and in a plane between said reflector and the stage of the microscope from a retracted position out of the path of light from said reflector to the microscope to an operative position in the path of the light from said reflector to the microscope.

References Cited in the file of this patent

UNITED STATES PATENTS

| | | |
|---|---|---|
| 277,869 | Bausch | May 22, 1883 |
| 658,611 | Bausch | Sept. 25, 1900 |
| 707,422 | Ives | Aug. 19, 1902 |
| 1,628,862 | Townsend | May 17, 1927 |
| 1,758,240 | Roach | May 13, 1930 |
| 1,879,737 | Del Riccio | Sept. 27, 1932 |
| 1,960,554 | Siedentopf | May 29, 1934 |
| 1,991,997 | Bauersfeld et al. | Feb. 19, 1935 |
| 2,006,125 | Barber | June 25, 1935 |
| 2,135,870 | Fassin | Nov. 8, 1938 |
| 2,289,575 | Critoph et al. | July 14, 1942 |
| 2,435,300 | Weiskopf | Feb. 3, 1948 |
| 2,471,879 | Lowber et al. | May 31, 1949 |
| 2,530,352 | Gallasch | Nov. 14, 1950 |